US010352444B2

United States Patent
Hirsch et al.

(10) Patent No.: US 10,352,444 B2
(45) Date of Patent: Jul. 16, 2019

(54) PISTON FOR AN INTERNAL COMBUSTION ENGINE

(71) Applicant: Mahle International GmbH, Stuttgart (DE)

(72) Inventors: Markus A. Hirsch, Stuttgart (DE); Markus Walch, Bretten (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/763,092

(22) PCT Filed: Sep. 13, 2016

(86) PCT No.: PCT/EP2016/071480
§ 371 (c)(1),
(2) Date: Mar. 23, 2018

(87) PCT Pub. No.: WO2017/050606
PCT Pub. Date: Mar. 30, 2017

(65) Prior Publication Data
US 2018/0216733 A1   Aug. 2, 2018

(30) Foreign Application Priority Data
Sep. 25, 2015   (DE) .................. 10 2015 218 430

(51) Int. Cl.
*F16J 1/09*   (2006.01)
*F16J 1/00*   (2006.01)
(Continued)

(52) U.S. Cl.
CPC . *F16J 1/09* (2013.01); *F01P 3/10* (2013.01); *F02F 3/20* (2013.01); *F16J 1/005* (2013.01)

(58) Field of Classification Search
CPC ............ F02F 3/00; F02F 3/105; F02F 3/0015
See application file for complete search history.

(56) References Cited

U.S. PATENT DOCUMENTS 2,572,260 A  *  10/1951  Hall ......................... F02F 3/22
                                                    123/41.38
3,633,468 A  *   1/1972  Burck .................. F02F 3/0069
                                                    123/41.35
(Continued)

FOREIGN PATENT DOCUMENTS

AT    001919 U1   1/1998
DE   2539470 A1   3/1977
(Continued)

OTHER PUBLICATIONS

English abstract for JP-H11-218054.
Machine translation of JP-S55-106348.

*Primary Examiner* — Long T Tran
(74) *Attorney, Agent, or Firm* — Fishman Stewart PLLC

(57) ABSTRACT

A piston for an internal combustion engine may include a piston head and a piston skirt. The piston skirt may include a plurality of box walls and a plurality of skirt walls. The plurality of box walls may be arranged opposite one another and may include a plurality of boss bores. The plurality of skirt walls may be arranged opposite one another and may have running surfaces. The piston may also include a cover element that may include a substantially circular cover plate and an aperture. The aperture may be disposed on the cover plate and may be configured for the passage of a connecting rod. The cover element may be secured to a lower region of the piston skirt. The cover plate may close a piston cross-sectional area.

20 Claims, 2 Drawing Sheets

(51) Int. Cl.
*F02F 3/20* (2006.01)
*F01P 3/10* (2006.01)

(56) References Cited

U.S. PATENT DOCUMENTS

| | | | |
|---|---|---|---|
| 4,142,484 A | 3/1979 | Buhl | |
| 4,377,967 A | 3/1983 | Pelizzoni | |
| 4,651,629 A * | 3/1987 | Castarede | F02B 23/0696 |
| | | | 123/193.6 |
| 4,932,314 A * | 6/1990 | Baris | F02F 3/0023 |
| | | | 123/193.6 |
| 5,115,725 A * | 5/1992 | Horiuchi | F02B 23/0672 |
| | | | 403/125 |
| 5,794,582 A * | 8/1998 | Horiuchi | F16J 1/22 |
| | | | 123/193.6 |
| 2004/0129243 A1* | 7/2004 | Robelet | B21J 5/00 |
| | | | 123/193.6 |
| 2012/0222632 A1* | 9/2012 | Scharp | F02F 3/003 |
| | | | 123/41.37 |
| 2013/0284141 A1* | 10/2013 | Nyberg | F02F 3/0069 |
| | | | 123/193.6 |
| 2014/0216246 A1* | 8/2014 | Laimboeck | F02F 3/0092 |
| | | | 92/208 |
| 2016/0298523 A1 | 10/2016 | Bischofberger et al. | |

FOREIGN PATENT DOCUMENTS

| | | |
|---|---|---|
| DE | 102013018249 A1 | 5/2015 |
| EP | 1818531 A2 | 8/2007 |
| FR | 861540 A | 2/1941 |
| JP | S55-106348 U | 7/1980 |
| JP | S60-3252 U | 1/1985 |
| JP | H11-218054 A | 8/1999 |
| WO | 2010/002293 A1 | 1/2010 |
| WO | 2012078093 A1 | 6/2012 |
| WO | WO 2015/062719 A1 * | 5/2015 |

* cited by examiner

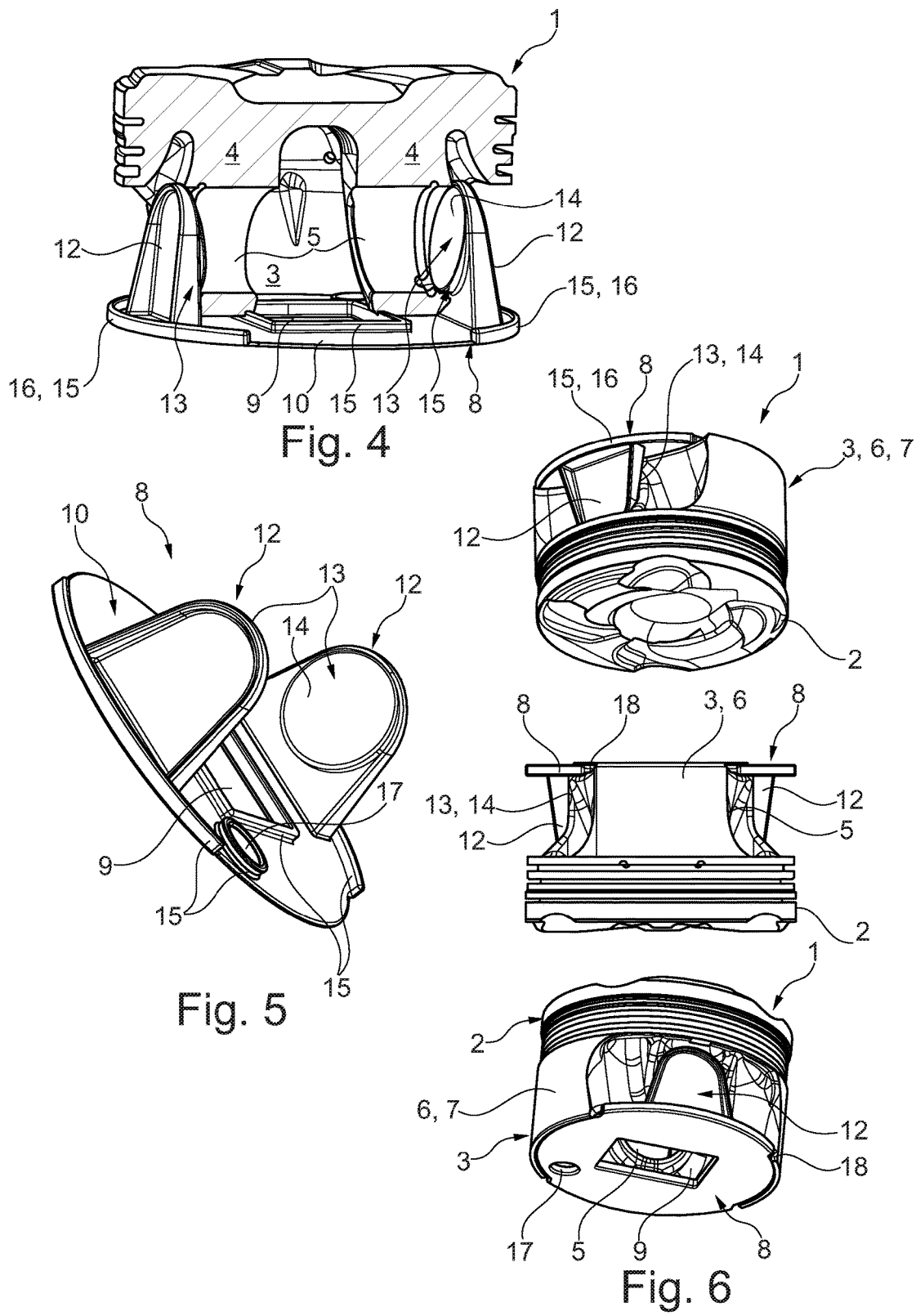

PISTON FOR AN INTERNAL COMBUSTION ENGINE

CROSS-REFERENCE TO RELATED APPLICATIONS

This application claims priority to International Patent Application No. PCT/EP2016/071480, filed on Sep. 13, 2016, and German Patent Application No. DE 10 2015 218 430.7, filed on Sep. 25, 2015, the contents of both of which are hereby incorporated by reference in their entirety.

TECHNICAL FIELD

The present invention relates to a piston for an internal combustion engine, having a piston head and a piston skirt.

BACKGROUND

DE 10 2013 018 249 A1 discloses a piston of the type in question for an internal combustion engine, having a piston head and a piston skirt, wherein the piston skirt has box walls, which lie opposite one another and have boss bores, and skirt walls, which lie opposite one another and have running surfaces. Arranged in the lower region of the piston is a cover element, which has an aperture for the passage of a connecting rod. To enable this cover element to be fastened reliably on the piston, it has two mutually opposite longitudinal sides and two mutually opposite free ends, wherein grooves, in which the free ends of the cover element are accommodated under spring preload, are provided in the lower region of the skirt walls.

AT 001919 U1 likewise discloses a piston which has a retaining plate, between which and a piston top a space is formed into which there opens an outlet opening and wherein an opening for a return flow of oil is provided in the retaining plate. The intention is thereby both to enable reliable lubrication of a small end of a connecting rod and to achieve uniform cooling.

Cover elements for pistons have already been known for a long time, especially in the case of relatively small pistons, since they make it possible to eliminate expensive production steps for the production of cooling passages with the aid of salt cores.

Moreover, this enables the piston to be made thinner and therefore lighter in a top and in a ring region since there is no need to provide space for the cooling passage, which in each case has to be separated both from the internal chamber and from the combustion chamber and from the rings at least by minimum wall thicknesses. In general, however, spray cooling is less efficient than a cooling passage carrying a flow within the piston since the oil usually comes into contact with the piston only once or twice for a brief period of time and is heated less intensely during this process. For this reason, significantly more oil is required to cool the pistons to dissipate a predefined quantity of heat, requiring additional power from the oil pump and thereby increasing fuel consumption.

Another disadvantage with the spray-cooled pistons with cover elements that are known from the prior art is that, with these pistons, only a certain region of the piston is efficiently cooled but other regions are not cooled at all.

SUMMARY

The present invention is therefore concerned with the problem of specifying an improved or at least alternative embodiment for a piston of the type in question which overcomes the disadvantages known from the prior art.

According to the invention, this problem is solved by the subject matter of the independent claim(s). Advantageous embodiments form the subject matter of the dependent claim(s).

The present invention is based on the general concept of using for the first time a cover element which closes a piston cross section of a piston for an internal combustion engine (spark ignition or diesel), preferably almost completely, thereby making it possible from now on to effectively cool even regions which were previously not cooled, e.g. between the box walls and the cylinder running surface. The piston according to the invention is preferably composed of light metal and is, for example, a casting composed of an aluminum alloy. In a known manner, it has in this case a piston head and a piston skirt, wherein the piston skirt has box walls, which lie opposite one another and have boss bores, and skirt walls, which lie opposite one another and have running surfaces. The cover element according to the invention, which has an aperture for the passage of a connecting rod, is arranged in that region of the piston which is remote from the piston head, i.e. at the bottom in the operating state. Here, the cover element has an approximately circular cover plate having the aperture, wherein this cover plate closes the piston cross section, preferably almost completely according to the invention, and thereby keeps the oil sprayed in for cooling in contact with the piston to be cooled for a longer time, thereby enabling the piston to be cooled more intensively than before. By means of the enlargement according to the invention of a cover element already known from DE 10 2013 018 249 A1, it is thus possible to cool the piston more effectively than before and thereby to reduce the oil required for cooling, as a result of which it is possible to operate an oil pump with a reduced power, this contributing in turn to a reduction in fuel consumption.

In an advantageous development of the solution according to the invention, the cover element is formed from metal, in particular as a metal sheet. A cover element designed in this way can be produced relatively cheaply as a formed sheet-metal stamping, wherein the required sheet thickness and therefore also the weight of the cover element can be kept relatively low, as can the material requirement and hence also the production costs. At the same time, a metallic cover element offers the major advantage that it is resistant to every kind of lubricating oil, and therefore it can preferably remain in the piston for the entire service life after installation. Here, the securing of the cover element on the piston itself takes place, in particular, in the region of the boss bores on the box walls, wherein the cover element is adhesively bonded or welded to the box walls in the region of the boss bores, for example. Particularly in the case of welding, even small spot welds are sufficient, and this can be accomplished by means of a laser, for example. Of course, brazing of the cover element to the piston is also conceivable.

In an alternative embodiment of the piston according to the invention, the cover element is formed from plastic, in particular as an injection-molded plastic part. A cover element designed in this way allows high quality and, at the same time, extremely low-cost production, while the material plastic additionally has the major advantage that it has a relatively low density and the cover element therefore has a relatively low weight.

In an advantageous development of the cover element according to the invention, it can have retaining webs which cover the boss bore from the outside. In this case, securing of the cover element is also possible for the retaining webs in the boss bores of the piston, and therefore it is possible to dispense with further welding or adhesive bonding.

In an advantageous development of the solution according to the invention, an extension formed in a manner complementary to the boss bore is arranged on the respective retaining web, said extension engaging in the boss bore and closing the latter with respect to the outside when the cover element is mounted. In this case, the extension arranged on the respective retaining web thus forms a latching joint, wherein the boss bore forms the mating latching contour, thus allowing the cover element to be mounted on the piston simply by latching the two extensions from the outside into the two boss bores, which are arranged in alignment with one another.

In another advantageous embodiment of the solution according to the invention, the retaining webs and the extensions thereof are designed as pin securing means and secure a pin accommodated in the boss bore against drifting out accidentally. In this case, the cover element according to the invention would not only improve the cooling of the piston but, in addition, would also assume a securing function for the pin in the boss bore, thereby making it possible, purely in theory, to dispense with further securing elements, e.g. retaining rings or the like, which likewise allows a reduction in production costs.

In another advantageous embodiment of the solution according to the invention, the cover plate has a rim raised toward the piston head in the region of an outer edge and/or in the region of the aperture. This rim effects retention of the oil splashing off the piston onto the cover plate and prolongs the heat-transferring contact since the oil accumulated on the cover plate can be sprayed onto the piston again during the further backward and forward movement of the piston and thereby cools the latter. Moreover, the raised rim serves as a reinforcing rib, thereby reinforcing the cover element.

In the same way, an injection opening, through which the oil cooling the piston is injected through the cover plate of the cover element, can also be surrounded with such a rim raised in the direction of the piston head, thus in this case too enabling unwanted draining of oil that impairs an oil injection process, for example, to be reliably prevented.

Further important features and advantages of the invention will become apparent from the dependent claims, from the drawings and from the associated description of the figures with reference to the drawings It is self-evident that the features mentioned above and those which remain to be explained below can be used not only in the respectively indicated combination but also in other combinations or in isolation without exceeding the scope of the present invention.

Preferred illustrative embodiments of the invention are shown in the drawings and are explained in greater detail in the following description, wherein identical reference signs refer to identical or similar or functionally identical components.

BRIEF DESCRIPTION OF THE DRAWINGS

Of the figures, each of which is schematic:
FIG. 4 shows a section through a piston according to the invention having an alternative cover element,
FIG. 5 shows a cover element designed as an injection-molded plastic part,
FIG. 6 shows various views of a piston according to the invention having a cover element as per FIG. 5.

DETAILED DESCRIPTION

Figure 1:
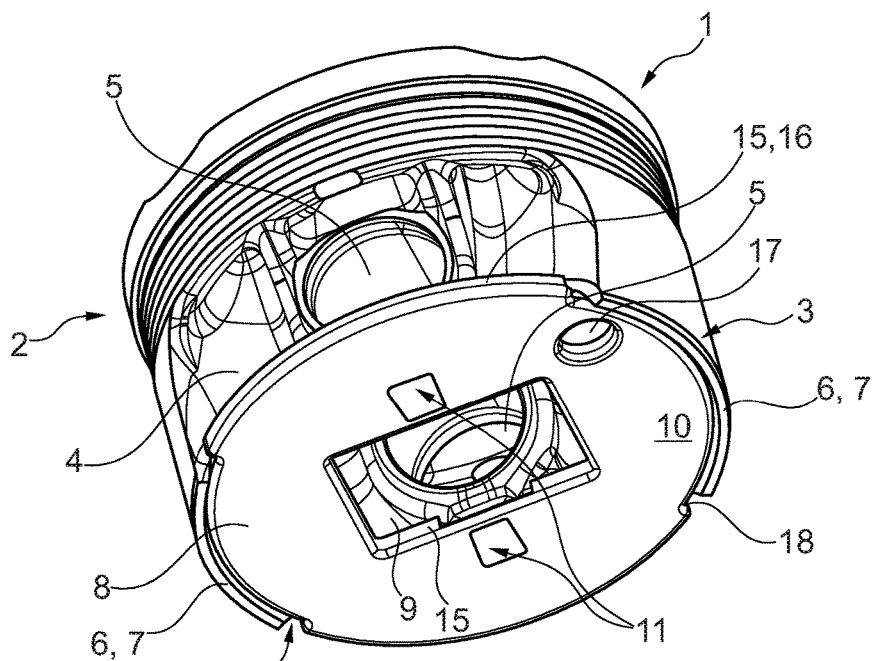
FIG. 1 shows a view from the side and from below of a piston according to the invention.

According to FIGS. 1 to 4 and 6, a piston 1 according to the invention for an internal combustion engine, which is otherwise not shown, has a piston head 2 and a piston skirt 3. The piston skirt 3 has box walls 4, which lie opposite one another and have boss bores 5, and skirt walls 6, which lie opposite one another and have running surfaces 7. In this arrangement, a cover element 8, which has an aperture 9 for the passage of a connecting rod (not shown), is provided in the lower region of the piston 1, i.e. in a region remote from the piston head 2. According to the invention, this cover element 8 now has an approximately circular cover plate 10 having the aperture 9, wherein the cover plate 10 closes a piston cross section, preferably almost completely (compare especially FIGS. 1, 2 and 6). In comparison with cover elements known from the prior art, the cover element 8 thus closes not only a region between the box walls 4 but furthermore also a region between the box walls 4 outward as far as a cylinder sliding surface (not shown).

Figure 2:
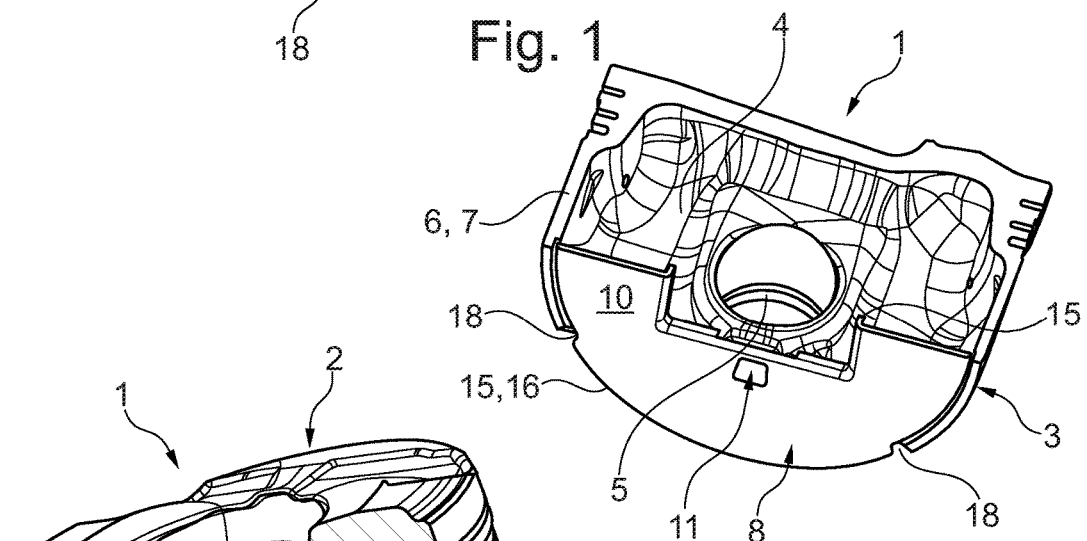
FIG. 2 shows a section through a piston having a cover element according to the invention.
Figure 3:
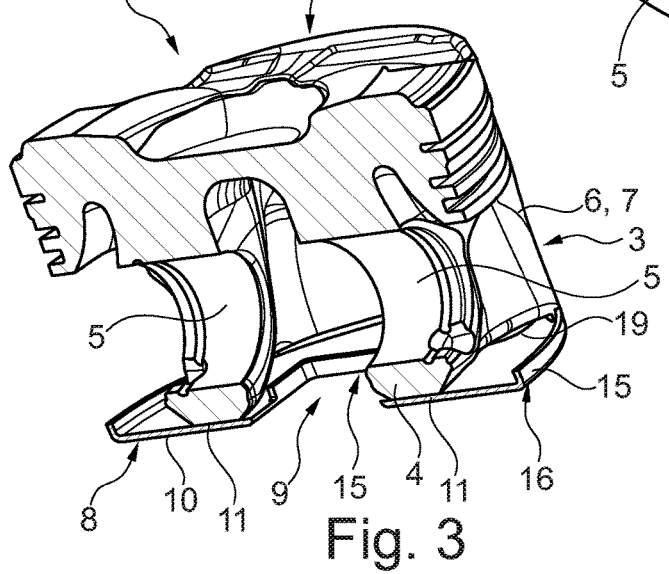
FIG. 3 shows an illustration like that in FIG. 2 but in a different section plane.

Considering the cover element 8 shown in FIGS. 1 to 3, this is formed there from a metal material, in particular as a low-cost formed sheet-metal part, which can be manufactured to high quality standards. In this case, the cover element 8 is connected, e.g. adhesively bonded, welded or brazed to the box walls 4 in the region 11 of the boss bores 5.

As an alternative, it is also possible for the cover element 8 to be formed from plastic, e.g. as an injection-molded plastic part, and can then have the form shown in FIGS. 4 to 6. Here, the cover element 8 has retaining webs 12, which cover the boss bores 5 from the outside and on which is arranged an extension 13, which is of complementary design to the respective boss bore 5 and engages in the boss bore 5 from the outside and thereby closes the latter with respect to the outside when the cover element 8 is mounted. In this case, the two extensions 13 each have a surface 14 which slopes relative to an axis of the piston 1 and outward in the direction of the piston top 2 and which allows easier mounting of the cover element 8 on the piston 1 while, on the other hand, making accidental detachment of the cover element 8 from the piston 1 more difficult. Here, the surface 14 is designed in the manner of a wedge surface, which is arranged with a slope such that, on the one hand, it is easier to slide the extensions 13 onto the boss bores 5, as already mentioned, but accidental release of the extensions 13 from the boss bores 5 is made more difficult. Together with the boss bores 5, extensions 13 designed in this way thus allow simple latching of the cover element 8 on the piston 1 and, as a result, extremely simple mounting. At the same time, the extensions 13 can be designed in such a way that they prevent a pin (not designated specifically) accommodated in the boss bores 5 from accidentally drifting out, the two extensions 13 thus performing a securing function in this case. In particular, this makes it possible to eliminate previously required securing elements, e.g. splints or retaining rings, thereby likewise making it possible to achieve a simplification of assembly and a cost reduction.

Common to all the embodiments here is that, in the region of the aperture 9, the cover plate 10 has a rim 15 which is raised toward the piston head 2 and which at least hinders unwanted and rapid outflow of injected oil and thereby supports the cooling effect. Owing to the fact that the premature outflow of the injected oil is prevented, it can come into contact several times with the piston 1 during operation owing to the backward and forward movement of said piston and can thereby be used for cooling. In the same way, the cover plate 10 can also have a rim 15 which is raised toward the piston head 2 in the region of an outer edge 16, said rim at least making rapid outflow of the oil to a cylinder wall more difficult, said outflow being inefficient in respect of cooling. At the same time, the cover plate 10 is reinforced by the rim 15.

Giving further consideration to the cover elements 8 shown in FIGS. 1 to 6, it can be seen that they have an injection opening 17 in the respective cover plate 10, through which opening oil is injected from an oil nozzle (not shown) firmly connected to the crankcase (not shown) and directed at the injection opening 17 during the operation of the internal combustion engine in order to cool the piston 1. The injection opening 17 is arranged in such a way that the as much as possible of the jet from the oil nozzle enters the interior of the box-shaped piston skirt. The injection opening 17 is preferably situated in a corner region of the piston skirt, in the vicinity of the transition from a skirt wall 6 to a box wall 4 and hence outside the pivoting plane of the connecting rod (not shown) and of the regions of the pin bosses 5.

In this case, the injection opening 17 can likewise be surrounded by a rim 15 raised in the direction of the piston head 2, said rim preventing an uncontrolled and unwanted outflow of oil. This is of decisive importance especially in the region of the injection opening 17 since oil emerging at this point would make reliable injection of further oil more difficult in some circumstances. Apart from retaining oil, all the rims 15 here additionally also bring about reinforcement of the cover plate 10 and hence reinforcement of the entire cover element 8 since they act as reinforcing ribs.

Considering FIGS. 1, 2 and 6 again, a recess 18 in the form of a clearance can be seen between the outer edge 16 of the cover plate 10 and the skirt wall 6, and this clearance can ensure the flexibility of the skirt walls 6 which is necessary during operation. In the same way, there is of course in each case a minimum clearance between the two skirt walls 6 and the cover plate 8 to allow the deformations of the skirt walls 6 which occur during operation without the cover plate 10 striking against the inside of the respective skirt wall 6 in the process.

Furthermore, an opening 19 (visible in FIG. 3) in the form of a gap is provided between the cover plate 10 and each of the box walls 4, through which gap the oil initially injected into the piston skirt can flow on at least in part into the outer regions between each box wall 4 and the cylinder sliding surface. The opening 19 is formed by virtue of the fact that the cover plate 10 does not rest over the full length against the bottom edge of the respective box wall 4 but leaves a clearance in the mounted state. As an alternative or in addition, it is also possible for apertures or penetrations to be provided as openings in the box walls 4, said apertures or penetrations establishing a connection for the oil between the space within and the space outside the piston skirt. After the oil has absorbed heat through repeated contact with the piston as a result of the upward and downward movement, it finally passes back into the crankcase through the aperture 9, the injection opening 17 or the recess 18 or along the cylinder sliding surface through a remaining circumferential gap relative to the cover plate 10.

With the cover element 9 according to the invention and the piston 1 according to the invention, small pistons 1, in particular, for which the production of a cooling passage by means of a salt or sand core is not worthwhile, can be cooled in a manner which is comparatively simple in terms of design, inexpensive but nevertheless effective. By virtue of the multiple forced contact between the oil and the piston 1, the oil used for cooling can be heated more intensively and, as a result, the capacity of an oil pump and, as a corollary, the fuel consumption of an internal combustion engine fitted with a piston 1 of this kind can be lowered.

The invention claimed is:

1. A piston for an internal combustion engine, comprising:
a piston head and a piston skirt;
the piston skirt including a plurality of box walls and a plurality of skirt walls, the plurality of box walls arranged opposite one another and including a plurality of boss bores, the plurality of skirt walls arranged opposite one another and having running surfaces;
a cover element including a cover plate, a plurality of retaining webs that cover the plurality of boss bores from an outside, and an aperture, the aperture disposed on the cover plate and configured for the passage of a connecting rod, the cover element secured to a lower region of the piston skirt;
wherein the cover plate closes a piston cross-sectional area.

2. The piston as claimed in claim 1, wherein the plurality of retaining webs project from the cover plate toward the piston head and are disposed radially outside the plurality of box walls relative to a central axis of the piston head.

3. The piston as claimed in claim 2, further comprising an extension complementary to at least one boss bore of the plurality of boss bores arranged on a respective retaining web of the plurality of retaining webs, the extension engaging in the at least one boss bore and closing the at least one boss bore with respect to the outside when the cover element is mounted.

4. The piston as claimed in claim 3, wherein the respective retaining web and the extension together provide a pin securing mechanism and secure a pin accommodated in the at least one boss bore.

5. The piston as claimed in claim 2, further comprising a plurality of extensions, each extension of the plurality of extensions configured complementary to a respective boss bore of the plurality of boss bores, wherein each extension is arranged on a respective retaining web of the plurality of retaining webs projecting radially inward therefrom relative to the central axis, wherein each extension is received in and engages the respective boss bore and closes the respective boss bore with respect to the outside when the cover element is mounted.

6. The piston as claimed in claim 5, wherein each extension has a radially inward facing surface which is sloped radially outward in an axial direction, relative to the central axis, from the lower region of the piston skirt to the piston head.

7. The piston as claimed in claim 1, wherein the cover plate includes an aperture rim projecting toward the piston head and surrounding the aperture.

8. The piston as claimed in claim 1, wherein the cover plate includes at least one edge rim projecting toward the piston head and extending at least partial around an outer edge of the cover plate.

9. The piston as claimed in claim 1, wherein the cover element includes an injection opening through which oil is injectable.

10. The piston as claimed in claim 9, wherein the injection opening is surrounded by an injection opening rim projecting from the cover plate toward the piston head.

11. The piston as claimed in claim 1, wherein the cover plate completely closes the piston cross-sectional area.

12. The piston as claimed in claim 1, wherein plurality of box walls are arranged radially inwards from an outer circumference of the piston head relative to a central piston axis of the piston head and define a radial extent smaller than a radial extent of the piston head.

13. The piston as claimed in claim 12, wherein the cover plate covers a cross-sectional area defined between the plurality of box walls and the outer circumference of the piston head.

14. The piston as claimed in claim 1, wherein the cover element is connected to the plurality of box walls in a region of the plurality of boss bores.

15. The piston as claimed in claim 14, wherein the cover element is connected to the plurality of box walls via at least one of i) a brazed connection, ii) an adhesively bonded connection, and iii) a welded connection.

16. A piston, comprising:
a piston head;
a piston skirt including a plurality of boss bores, a plurality of box walls arranged opposite one another and radially inward from an outer circumference of the piston head relative to a central axis of the piston head, and a plurality of skirt walls arranged opposite one another and having running surfaces, the plurality of box walls and the plurality of skirt walls defining a piston cross-sectional area at a lower region of the piston skirt disposed opposite the piston head; and
a cover element couplable to the plurality of box walls in a region of the plurality of boss bores, the cover element including a cover plate and an aperture, the aperture disposed on the cover plate and configured for the passage of a connecting rod, wherein the cover plate closes the piston cross-sectional area at the lower region of the piston skirt when the cover element is coupled to the plurality of box walls;
wherein the cover plate extends radially beyond the plurality of box walls relative to the central axis when the cover element is coupled to the plurality of box walls.

17. The piston as claimed in claim 16, wherein the cover element further includes a plurality of retaining webs structured and arranged to cover the plurality of boss bores from an outside when the cover element is coupled to the plurality of box walls.

18. The piston as claimed in claim 17, further comprising a plurality of extensions, each extension of the plurality of extensions configured complementary to a respective boss bore of the plurality of boss bores and arranged on a respective retaining web of the plurality of retaining webs, wherein each extension engages the respective boss bore and closes the respective boss bore with respect to the outside when the cover element is coupled to the piston.

19. A piston, comprising:
a piston head;
a piston skirt including a plurality of boss bores, a plurality of box walls arranged opposite one another, and a plurality of skirt walls arranged opposite one another and each having a running surface, the plurality of box walls and the plurality of skirt walls defining a piston cross-sectional area at a lower region of the piston skirt disposed opposite the piston head; and
a cover element couplable to the plurality of box walls in a region of the plurality of boss bores, the cover element including a cover plate and an aperture, the aperture disposed on the cover plate and configured for the passage of a connecting rod, wherein the cover plate closes the piston cross-sectional area at the lower region of the piston skirt when the cover element is coupled to the plurality of box walls;
wherein an outer edge of the cover plate includes a plurality of notches extending radially inward relative to a central axis of the piston head, each of the plurality of notches structured complimentary to a respective skirt wall of the plurality of skirt walls and arranged to receive the respective skirt wall when the cover element is mounted.

20. The piston as claimed in claim 19, wherein a remaining un-notched portion of the outer edge of the cover plate is axially aligned with an outer circumference of the piston head relative to the central axis when the cover element is mounted.

* * * * *